United States Patent [19]

Levine

[11] Patent Number: 4,492,550

[45] Date of Patent: Jan. 8, 1985

[54] EXTRUSION APPARATUS

[75] Inventor: Morris M. Levine, Scarsdale, N.Y.

[73] Assignee: CIC Int'l. Corp., New York, N.Y.

[21] Appl. No.: 558,289

[22] Filed: Dec. 5, 1983

[51] Int. Cl.³ .......................... A21C 3/04; A21C 5/02; A21C 11/18

[52] U.S. Cl. ................................... 425/142; 425/151; 425/164; 425/167; 425/308

[58] Field of Search ............... 425/142, 164, 167, 151, 425/153, 155, 308; 83/651.1

[56] References Cited

U.S. PATENT DOCUMENTS

| | | | |
|---|---|---|---|
| 824,008 | 6/1906 | Gowdy | 425/142 |
| 2,634,691 | 4/1953 | Flockhart | 425/308 |
| 3,354,546 | 11/1967 | Pagliuca | 83/651.1 |
| 3,398,702 | 8/1968 | Behr | 425/153 |
| 3,611,951 | 10/1971 | Sloan | 425/151 |
| 3,728,057 | 4/1973 | Grundman et al. | 425/151 |
| 3,756,111 | 9/1973 | Weidenmiller | 83/651 |

FOREIGN PATENT DOCUMENTS 2415594 10/1975 Fed. Rep. of Germany ..... 83/651.1

Primary Examiner—Willard E. Hoag
Attorney, Agent, or Firm—Charles E. Baxley

[57] ABSTRACT

An illustrative embodiment of the invention extrudes dough through two hoppers. A cutting wire severs the extruded portions of the dough from the extrusion hoppers after a predetermined delay. The extrusion press, moreover, is of intermittent action in response to the quantity of dough extruded from the hoppers. Safety interlock switches associated with the apparatus housing automatically deenergize the apparatus.

4 Claims, 2 Drawing Figures

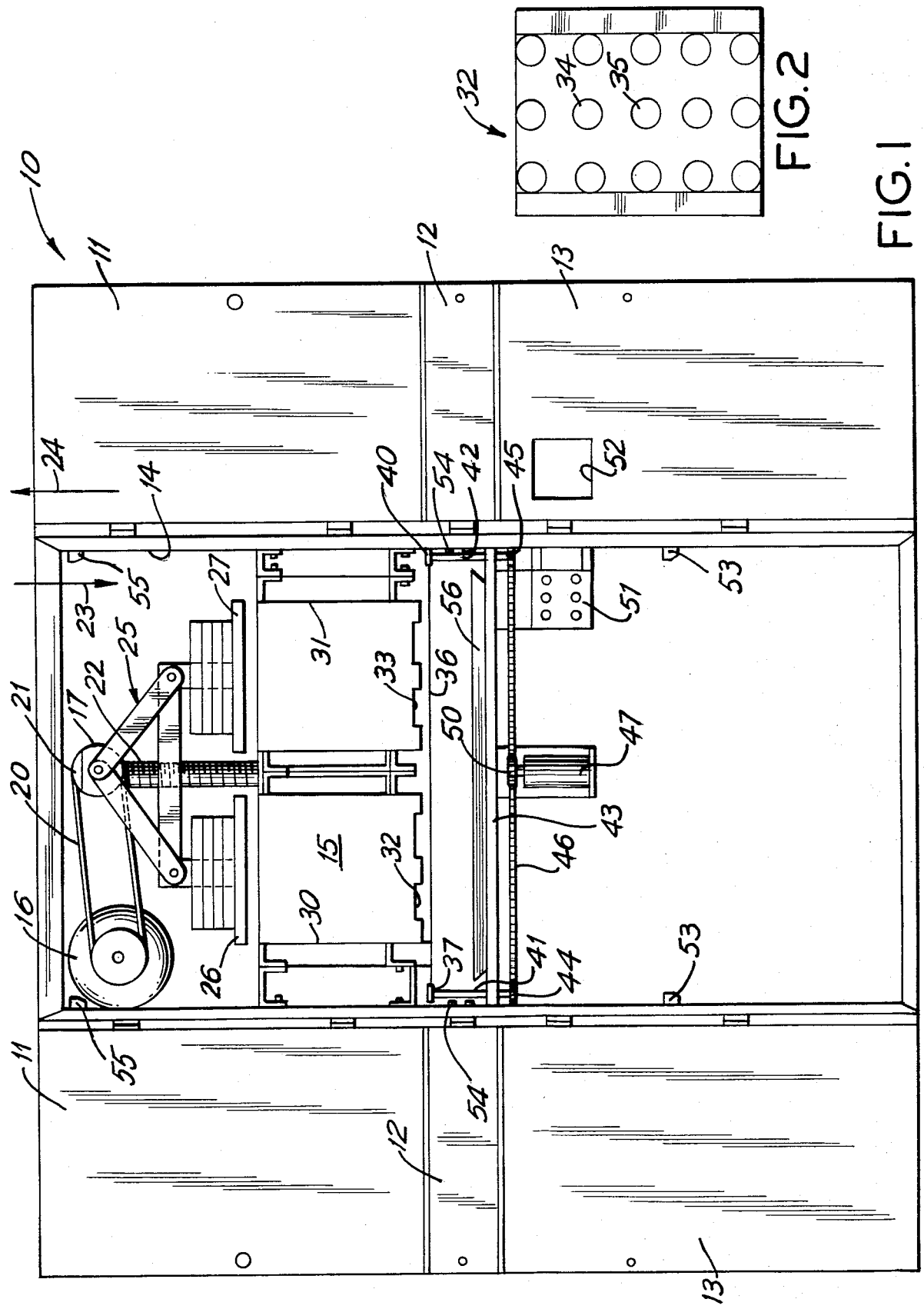

EXTRUSION APPARATUS

BACKGROUND OF THE INVENTION

1. Field of the Invention

This invention relates to extrusion machinery and, more particularly to apparatus for extruding dough for baked products, and the like.

2. Prior Art

Extruding dough and cutting predetermined extruded portions for subsequent processing into cookies and other baked products is a well-developed technology. There is a need, however, to improve the efficiency, sanitation and safety with which this process is accomplished. In the past, various extrusion press, wire cutter and timing mechanisms have been developed to accomplish this goal. These devices, however, all have required a great deal of direct human interaction as well as elaborate gear and drive systems.

Apparatus of this character fails, to a large extent, to provide inexpensive, clean and safe machinery for producing extruded dough portion of predetermined shape and weight.

BRIEF DESCRIPTION OF THE INVENTION

A relatively inexpensive, clean and safe device that minimizes human intervention is provided in accordance with the invention. Illustratively, a pair of adjacent hoppers each accommodate an extrusion press to force respective bricks of dough through the orifice of an extrusion die in order to reshape the bricks into the desired form.

A pressure sensitive switch, or other suitable apparatus, stops the extrusion press when sufficiently thick portions of batter have been forced through the orifice in the extrusion die. A predetermined time delay prevents the cutter mechanism from excising the extruded portions from the balance of the respective bricks until the proper thickness has been pressed through the dies.

In accordance with a feature of the invention, the cutting mechanism is a very fine wire that rotates on a pulley and spindle. The cutting spindle, moreover is rotated as the spindle advances along a worm gear in order to sweep the wire across the face of the extusion die and to enable the batter portions thus sliced from the balance of the respective bricks to drop onto a baking tray for later conveyance to an oven, or the like.

In accordance with another aspect of the invention, the entire apparatus is enclosed within a cabinet. This cabinet has separate doors for the extrusion press section, the cutting section and the motor drive section. Safety switches, associated with each of the doors, are able to deactivate the entire apparatus upon opening any one of the doors in order to prevent operator injury.

Thus, the invention provides a fully automatic, or semiautomatic device for cutting predetermined portions of uncooked dough in a swift, efficient manner that eliminates the unsatisfactory (and unsanitary) manual operations, e.g. pulling, cutting and chopping, that heretofore have characterized the prior art.

BRIEF DESCRIPTION OF THE DRAWING

FIG. 1 is a front elevation of a typical embodiment of the invention; and

FIG. 2 is a transverse view of a typical extrusion die for use in connection with the embodiment of the invention shown in FIG. 1.

DEAILED DESCRIPTION

For a more complete appreciation of the invention, attention is invited to FIG. 1 which shows a cabinet 10 that has three sets of hinged double doors, extrusion press doors 11, cutting section doors 12 and motor drive section doors 13. Within the cabinet 10 to which the doors 11, 12, 13 are hinged, a recess 14 houses an extrusion press 15. As shown, the extrusion press 15 includes an electric motor 16 that is connected to a pulley 17 by means of a driving belt 20.

The pulley rotates an internally threaded traveller or nut 21 that is received on a rigidly mounted and threaded shank 22 for movement in the direction of the shank's longitudinal axis as indicated by arrows 23, 24.

A generally triangular frame 25 is secured to the traveller 21 for longitudinal movement in the direction of the arrows 23, 24 in a manner, however, that does not permit the frame to rotate with the traveller 21 as it is advanced along the shank 22. The frame 25 has, at the respective angles formed on the side opposite the angle that is joined to the traveller 21, a pair of weighted extrusion press platens 26,27.

Each of the platens 26, 27, in accordance with the invention, is aligned with an individual hopper 30,31. Extrusion dies 32,33 form sides of the respective hoppers 30,31 that are opposite to the platens 26, 27. Attention is invited to FIG. 2 which shows a transverse view of the die 32 in which generally circular orifices 34, 35 are provided to establish the shape of the resulting baked products, as described subsequently in more detail.

Turning once more to FIG. 1, a cutting wire 36 is stretched transversely across the width of the cabinet 10. As shown, the cutting wire 36 is connected to spring biased rotatable pulleys 37,40. The pulleys 37, 40 moreover, each are axially secured to respective longitudinally oriented spindles 41, 42 which spindles space the cutting wire 36 longitudinally below the extrusion dies 32, 33 a sufficient distance to enable the cutting wire 36 to clear the dies.

The spindles 41, 42 are mounted in a transversely disposed base 43 in a manner that enables these spindles to rotate about their respective longitudinal axes, as well as to translate in directions that are perpendicular to the plane of FIG. 1 in order to sweep the cutting wire 36 back-and-forth under the extrusion dies 32, 33, as described later in fuller detail.

The ends of the spindles 41, 42 that are opposite to the pulleys 37, 40 terminate in individual sprockets 44, 45 that mesh with and are driven by a sprocket chain 46. The sprocket chain 46, in turn, is driven through an electrical sprocket drive motor 47 that has a driving sprocket gear 50.

The motors 16, 47 are controlled through switches 51 that are mounted on a panel that is in alignment with an access port 52 in the motor drive section door 13 of the cabinet 10. Further, with respect to the invention, the power supply circuits (not shown) for the motors 16, 47 are connected in series with pairs of door activated safety interlock switches 53, 54, 55, each associated with a respective one of the doors in the paired doors 13, 12, 11. The switches 53, 54, 55 are each electrically connected to the motors 16, 47 in a manner that deenergizes both of these motors if any one of the doors in the pairs of doors 11, 12, 13 are opened in order to protect personnel from possible injury through moving machinery.

In operation, two bricks of dough (not shown in the drawing) are each deposited in a respective one of the hoppers 30,31. The double doors 11, 12, 13 are closed to complete the safety interlock switch portions of the power circuit for the motors 16, 47. Appropriate switches 51 in the panel are activated through the access port 52 to complete the circuit that energizes the motors.

Thus energized, the motor 16 drives the pulley 17 in a manner that advances the traveller 21 in the direction of the arrow 23. Moving the platens 26, 27 in the direction of the arrow 23 presses the respective bricks of dough through the extrusion dies 32, 33.

In accordance with the invention, as suitable portions of the dough are pressed through the extrusion dies 32, 33, the platens 26, 27 are stopped in their advance in the direction of the arrow 23. The sprocket drive motor 47 then is energized to cause the sprocket chain 46 to rotate and to drive the spindles 41, 42 in directions that are generally perpendicular to the plane of FIG. 1. A number of control techniques can be employed to arrest the advance of the platens 26, 27. Illustratively, the back pressure applied by the dough to the platens 26, 27 and the walls of the hoppers 30, 31 can be sensed through a suitable device to stop the motion of the platens when a pressure is attained that corresponds to a suitable length of extruded dough. Alternatively, a photoelectric cell can be aligned with a suitable light source near the cutting wire 36 to enable a portion of the extruded dough to interrupt the light beam, when a suitable length has been extruded, and thus to temporarily stop the advance of the platens 26, 27. After a delay of 1 to 3 seconds the sprocket drive motor 47 is energized to sweep the cutting wire 36 across the faces of the extrusion dies 32, 33 in order to sever suitably extruded portions of the dough that protrude through the orifices in the extrusion dies 32, 33 and to enable these severed portions to drop to a flat baking pan 56 on the base 43.

The pan 56 then can be conveyed, either manually or automatically, to an oven in order to complete the baking process.

After the dough portions have been severed from the balance of the respective dough bricks, the cycle described above repeats itself until the bricks are entirely extruded through the dies 32, 33.

If, during one of the cycles of operation, any one of the doors in the pairs of doors 11, 12, 13 are opened, an associated one of the pairs of safety interlock switches 53, 54, 55 is disabled in order to immediately deenergize the motors 16, 47 and to stop all machinery motion and protect personnel from possible exposure to injury.

Thus, in accordance with the invention, there is provided an efficient apparatus that not only reduces human contact with the foodstuffs to a minimum, but also provides for fully automatic extrusion and severing of the dough into portions of acceptable predetermined thickness having shapes that are determined by the extrusion die orifice perimeters in a manner that protects operating personnel from injury during use.

I claim:

1. A dough extrusion apparatus comprising, a pair of hoppers, individual platens within each of said hoppers for movement therethrough, an extrusion die forming one side of each of said hoppers, a cutting wire space from said extrusion die, a pair of rotatably and axially movable spindles supporting said wire therebetween, a motor for driving said platens, a motor for driving said spindles a cabinet for enclosing the extrusion apparatus, at least one door on said cabinet for providing access to the extrusion apparatus, and safety interlock switch means for responding to said cabinet door by deenergizing said platen and cutting wire motors.

2. An apparatus according to claim 1 further comprising sprocket means coupling said spindles to said cutting wire motor.

3. An apparatus according to claim 2 further comprising means for arresting said platen motion within said hoppers in response to the quantity of the dough extruded therefrom.

4. An apparatus according to claim 3 further comprising means for improving a time delay between said arrested platen motion and energizing said cutting wire driving motor.

* * * * *